Aug. 5, 1930.  G. D. ANGLE  1,772,124

MULTICYLINDER IRREGULAR X-TYPE ENGINE

Filed Jan. 5, 1929

INVENTOR
G. D. ANGLE
BY Robert H. Young
ATTORNEY

Patented Aug. 5, 1930

1,772,124

UNITED STATES PATENT OFFICE

GLENN D. ANGLE, OF CINCINNATI, OHIO

MULTICYLINDER IRREGULAR X-TYPE ENGINE

Application filed January 5, 1929. Serial No. 330,603.

This invention relates to internal combustion engines, and has for its object to provide a power plant particularly adapted for use in aircraft.

A further object of the invention is to provide the maximum power output with the minimum frontal area per unit of power.

A further object of the invention is to provide, in an engine of this type, well separated intervals between the high load periods on each crank-pin.

A further object of the invention is to provide a multicylinder engine of fundamentally perfect inertia balance.

With these and other objects in view, the invention consists of the novel disposition and arrangement of the cylinders of the engine, all of which will be first fully described and afterwards specifically pointed out in the appended claims.

Referring to the accompanying drawings.

Like numerals of reference indicate the same parts throughout the several figures, in which.

Figure 1:
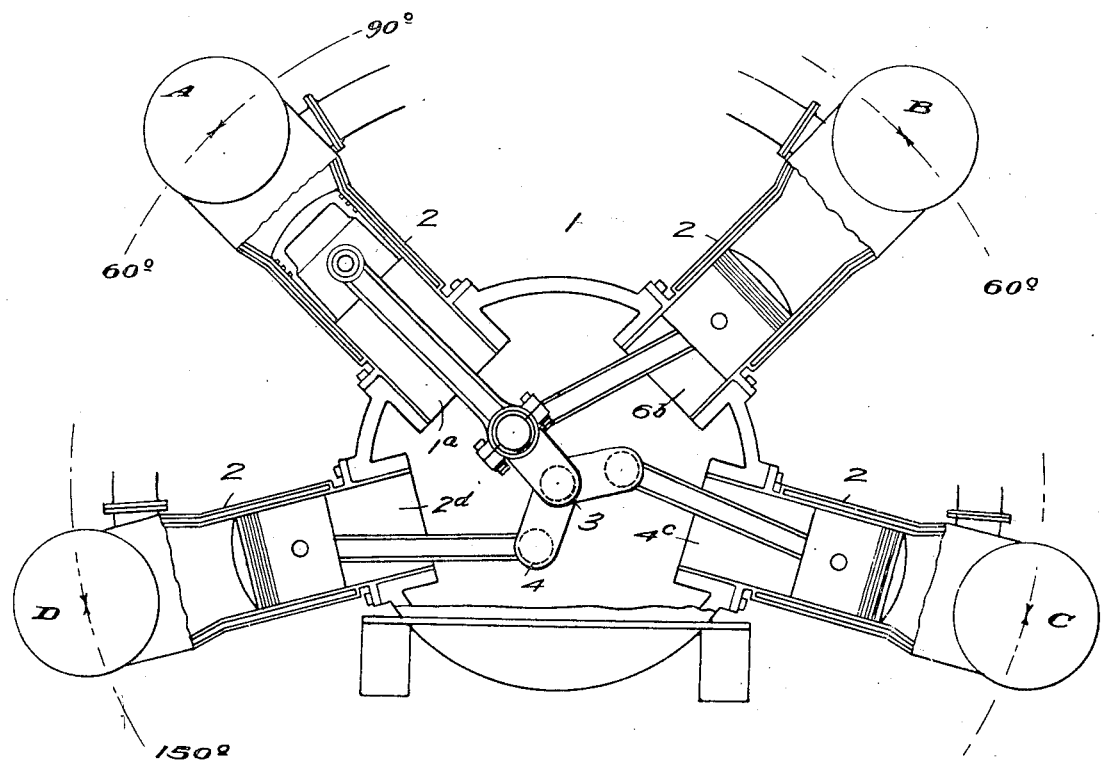
Figure 1 is a diagrammatic view of the engine illustrating the same in front elevation.
Figure 2:
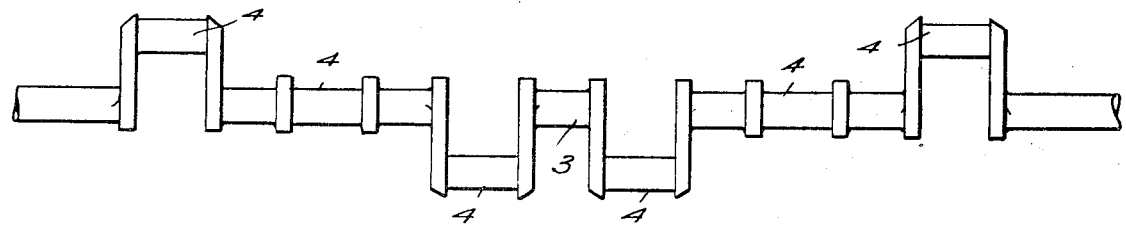
Figure 2 is a diagrammatic top plan view, illustrating the crankshaft thereof.
Figure 3:
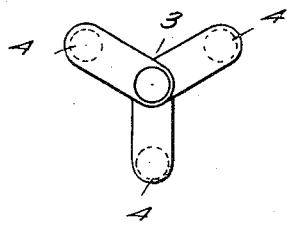
Figure 3 is a front elevation of the crankshaft.

1 indicates the engine, which is composed of preferably twenty-four cylinders 2 arranged in four rows A, B, C and D of six cylinders to each row. The complemental cylinders of said rows are disposed radially but irregularly about the central or crank-shaft axis, in such manner that the included angle between the two upper rows of cylinders A and B is 90 degrees, the included angles between rows A and D and B and C, being 60 degrees, while the included angle between the two lower rows of cylinders C and D is 150 degrees. This permits the use of a crankshaft 3 of conventional six throw type with crank pins 4 120 degrees apart, and allows even 30 degree intervals between power impulses.

In the following firing order of this irregular X-type engine, the intervals between the power impulses on each crank-pin are 150—150—150 and 270 degrees of crank-shaft rotation. The preferred firing order being as follows:

1A—4C—2D—6B—5A—1C—4D—2B—3A—5C—1D—4B
6A—3C—5D—1B—2A—6C—3D—5B—4A—2C—6D—3B

The particular advantage in maintaining a relatively long period between impulses is to minimize the load conditions on the crank-pin bearing, while such longer period permits an oil film to be better established in the bearing between the impulses.

Having thus described the invention which will be perfectly apparent to those skilled in the art, what I claim as new and desire to secure by Letters Patent of the United States is:

1. A multicylinder internal combustion engine in which the cylinders are arranged in four rows, the complemental cylinders of said rows being disposed radially but irregularly about the crank-shaft axis in such manner that the included angle between the two upper rows of cylinders is 90 degrees, while the included angle between the two lower rows of cylinders is 150 degrees, and a crankshaft having its crank pins disposed at 120 degrees from each other.

2. A multicylinder internal combustion engine in which the cylinders are arranged in four rows, the complemental cylinders of said rows being disposed radially but irregularly about the crank-shaft axis in such manner that the included angle between the two upper rows of cylinders is 90 degrees, while the included angle between the two lower rows of cylinders is 150 degrees.

In testimony whereof I affix my signature.

GLENN D. ANGLE.